(12) United States Patent
Dardona et al.

(10) Patent No.: US 10,345,799 B2
(45) Date of Patent: Jul. 9, 2019

(54) APPARATUS AND METHOD FOR NON-DESTRUCTIVE DETECTION OF FAN BLADE ELECTRICAL ISOLATION

(71) Applicant: United Technologies Corporation, Farmington, CT (US)

(72) Inventors: Sameh Dardona, South Windsor, CT (US); Cagatay Tokgoz, Beaumont, TX (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 254 days.

(21) Appl. No.: 15/470,799

(22) Filed: Mar. 27, 2017

(65) Prior Publication Data
US 2018/0275643 A1  Sep. 27, 2018

(51) Int. Cl.
| | | |
|---|---|---|
| F01D 5/14 | (2006.01) | |
| F01D 5/28 | (2006.01) | |
| G05B 23/02 | (2006.01) | |
| G01M 15/14 | (2006.01) | |
| F01D 21/00 | (2006.01) | |
| F01D 21/14 | (2006.01) | |
| F02C 9/00 | (2006.01) | |
| G05B 9/02 | (2006.01) | |

(52) U.S. Cl.
CPC ......... *G05B 23/0205* (2013.01); *F01D 5/147* (2013.01); *F01D 5/288* (2013.01); *F01D 21/003* (2013.01); *F01D 21/14* (2013.01); *G01M 15/14* (2013.01); *F02C 9/00* (2013.01); *F05D 2220/36* (2013.01); *F05D 2260/80* (2013.01); *F05D 2260/83* (2013.01); *F05D 2300/121* (2013.01); *F05D 2300/133* (2013.01); *G05B 9/02* (2013.01); *Y02T 50/671* (2013.01)

(58) Field of Classification Search
CPC   G05B 23/0205; G05B 23/02; G05B 23/0218; G01M 15/14; F02C 9/00; F05D 2260/80; F01D 21/003; F01D 21/14; F01D 5/147; F01D 5/288

See application file for complete search history.

(56) References Cited

U.S. PATENT DOCUMENTS

| | | |
|---|---|---|
| 5,621,327 A | 4/1997 | Chiang et al. |
| 5,872,408 A | 2/1999 | Rakov |

(Continued)

FOREIGN PATENT DOCUMENTS

| | | |
|---|---|---|
| EP | 2930306 A1 | 10/2015 |
| EP | 2955326 A1 | 12/2015 |

(Continued)

OTHER PUBLICATIONS

European Search Report for Application No. EP 18 16 4303.

*Primary Examiner* — George C Jin
(74) *Attorney, Agent, or Firm* — Cantor Colburn LLP

(57) ABSTRACT

An apparatus and method for detecting a short in a blade of a gas turbine engine, the apparatus including: a first plate configured to form a first capacitor with the protective sheath when the apparatus is located proximate to the blade; a second plate configured to form another capacitor with a portion of the airfoil when the apparatus is located proximate to the blade; and a voltage source electrically connected to the first plate and the second plate.

20 Claims, 5 Drawing Sheets

(56) References Cited

U.S. PATENT DOCUMENTS

| | | | |
|---|---|---|---|
| 7,521,926 B2 | 4/2009 | Beck et al. | |
| 8,513,960 B2 | 8/2013 | Schneider et al. | |
| 2015/0134270 A1* | 5/2015 | Long | G01M 15/14 702/33 |
| 2016/0072179 A1* | 3/2016 | Tokgoz | H01P 3/12 455/91 |
| 2016/0187366 A1* | 6/2016 | Tuor | F01D 17/06 415/118 |
| 2016/0319845 A1* | 11/2016 | Molnar | F04D 29/668 |

FOREIGN PATENT DOCUMENTS

| | | |
|---|---|---|
| WO | 2009034305 A2 | 3/2009 |
| WO | 2015034612 A1 | 3/2015 |

* cited by examiner

APPARATUS AND METHOD FOR NON-DESTRUCTIVE DETECTION OF FAN BLADE ELECTRICAL ISOLATION

BACKGROUND

Exemplary embodiments of the present disclosure are directed to a fan blade for a gas turbine engine and apparatus and methods for non-destructive detection of electrical isolation of the fan blade.

A gas turbine fan blade may be made out of aluminum, and to protect the leading edge from erosion, a titanium sheath is attached. Titanium and aluminum are galvanically incompatible materials, so they are isolated from each other as best possible, using non-conductive materials. However and in the event the isolation between them is defeated, galvanic corrosion could occur to the blade. In particular and in an aluminum/titanium coupling, with aluminum being the less noble element, the blade would become the anode in the galvanic couple and accordingly, corrosion may occur on the aluminum blade.

Accordingly, it is desirable to provide an apparatus and method for non-destructive detection of electrical isolation in the fan blade.

BRIEF DESCRIPTION

In one embodiment, an apparatus for detecting a short in a blade of a gas turbine engine is provided. The blade comprising: an airfoil formed from a first material; a protective sheath disposed on a leading edge of the airfoil, the protective sheath being formed from a second material, the first material being galvanically incompatible with the second material and the first material being less noble than the second material; and a non-conductive material disposed between the protective sheath and the airfoil so that they are electrically isolated from each other, wherein the apparatus includes: a first plate configured to form a first capacitor with the protective sheath when the apparatus is located proximate to the blade; a second plate configured to form another capacitor with a portion of the airfoil when the apparatus is located proximate to the blade; and a voltage source electrically connected to the first plate and the second plate.

In addition to one or more of the features described above, or as an alternative to any of the foregoing embodiments, the first plate may be spaced from the sheath and the second plate may be spaced from the airfoil when the apparatus is located proximate to the blade.

In addition to one or more of the features described above, or as an alternative to any of the foregoing embodiments, the first material may be aluminum.

In addition to one or more of the features described above, or as an alternative to any of the foregoing embodiments, the second material may be titanium.

In addition to one or more of the features described above, or as an alternative to any of the foregoing embodiments, the first plate and second plate may be formed from copper or other conductive materials and wherein the first plate and second plate are coated with a dielectric including but not limited to any of the following materials or combinations thereof; porcelain (ceramic), mica, glass, plastics, polymers, and oxides of various metals.

In addition to one or more of the features described above, or as an alternative to any of the foregoing embodiments, the first material may be aluminum, the second material may be titanium and the first plate and second plate may be formed from copper.

In addition to one or more of the features described above, or as an alternative to any of the foregoing embodiments, further including a microprocessor operatively coupled to a voltage sensor and a current sensor, wherein the microprocessor is configured to provide a signal to a fault indicator if a detected resistance between the protective sheath and the airfoil is less than a predetermined value.

In addition to one or more of the features described above, or as an alternative to any of the foregoing embodiments, the first material may be aluminum, the second material may be titanium and the first plate and second plate may be formed from copper.

In another embodiment, a method of determining an electrical short between a sheath and an airfoil of a fan blade of a gas turbine engine is provided. The method including the steps of: creating a first capacitor by locating a first plate proximate to the sheath of the airfoil, wherein sheath is formed from a first material and the sheath is electrically insulated from the airfoil by an insulator, wherein a second capacitor is formed by a portion of the sheath, a portion of the insulator and a portion of the airfoil and wherein the airfoil is formed from a second material, the first material being galvanically incompatible with the second material and the second material being less noble than the first material; creating a third capacitor by locating a second plate proximate to another portion of the airfoil, wherein the first capacitor, the second capacitor and the third capacitor are electrically connected in series; exciting the first plate and the second plate by a voltage source; and determining a resistance of the second capacitor wherein the determined resistance is indicative of an electrical short between the sheath and the airfoil.

In addition to one or more of the features described above, or as an alternative to any of the foregoing embodiments, the electrical short is detected without damaging the fan blade.

In addition to one or more of the features described above, or as an alternative to any of the foregoing embodiments, the first plate may be spaced from the sheath and the second plate may be spaced from the airfoil.

In addition to one or more of the features described above, or as an alternative to any of the foregoing embodiments, the electrical short is detected while the fan blade is secured to the gas turbine engine.

In addition to one or more of the features described above, or as an alternative to any of the foregoing embodiments, the electrical short is detected without removing the fan blade from a hub.

In addition to one or more of the features described above, or as an alternative to any of the foregoing embodiments, the first material may be titanium and the second material may be aluminum.

In addition to one or more of the features described above, or as an alternative to any of the foregoing embodiments, the first plate and second plate may be formed from copper.

In addition to one or more of the features described above, or as an alternative to any of the foregoing embodiments, the first material may be titanium, the second material may be aluminum and the first plate and second plate may be formed from copper or other conductive materials and wherein the first plate and second plate are coated with a dielectric including but not limited to any of the following materials or combinations thereof; porcelain (ceramic), mica, glass, plastics, polymers, and oxides of various metals.

In addition to one or more of the features described above, or as an alternative to any of the foregoing embodiments, further including the step of sensing with a microprocessor the resistance of the second capacitor.

In addition to one or more of the features described above, or as an alternative to any of the foregoing embodiments, the microprocessor may be operatively coupled to a voltage sensor and a current sensor, wherein the microprocessor is configured to provide a signal to a fault indicator if the resistance of the second capacitor is less than a predetermined value.

In addition to one or more of the features described above, or as an alternative to any of the foregoing embodiments, the first material may be titanium, the second material may be aluminum and the first plate and second plate may be formed from copper.

In addition to one or more of the features described above, or as an alternative to any of the foregoing embodiments, wherein the electrical short is detected without damaging the fan blade.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
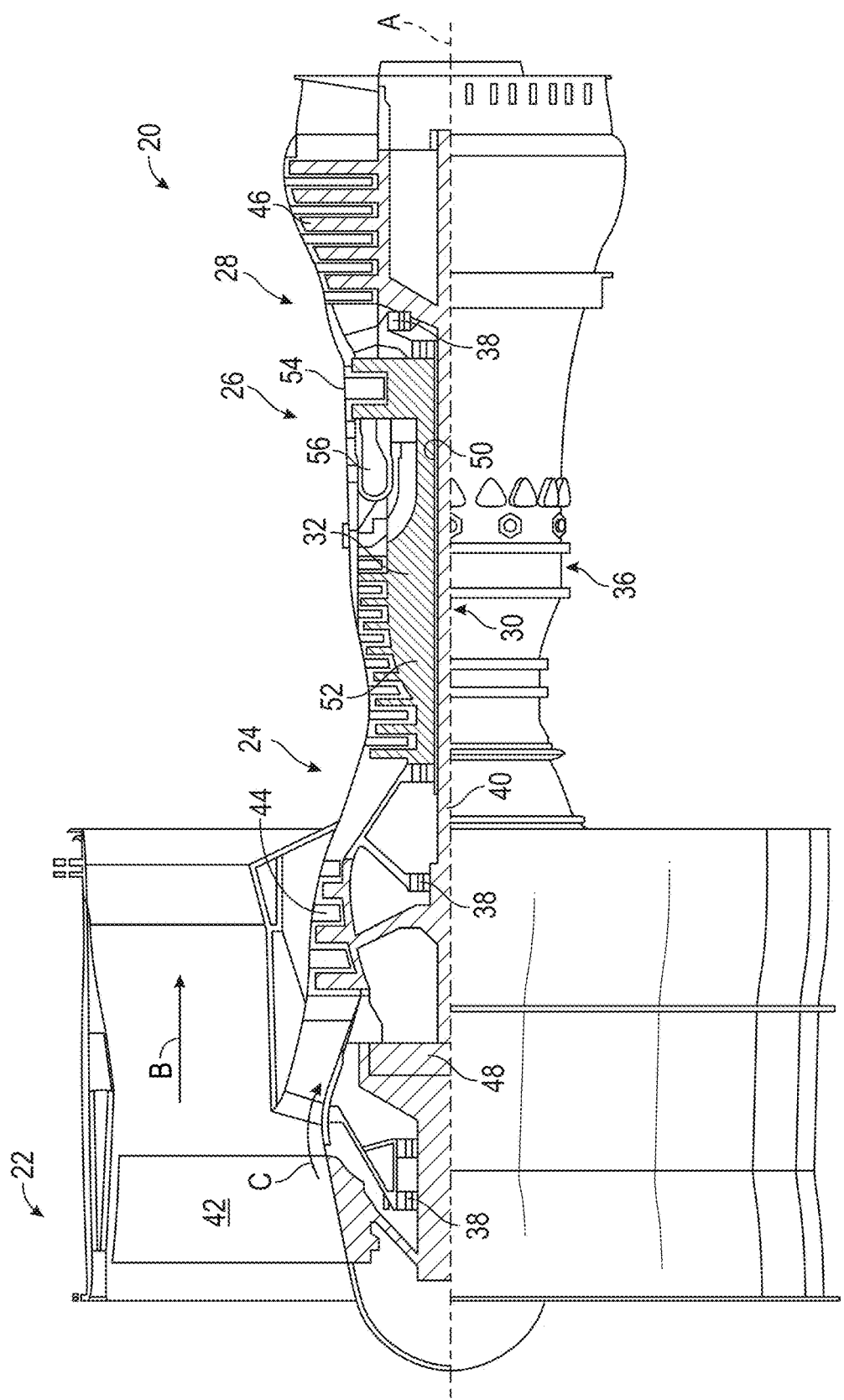
FIG. 1 is a partial cross sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ^\circ \text{ R})/(518.7^\circ \text{ R})]^{0.5}$. The "Low corrected fan tip speed" as disclosed herein according to one non-limiting embodiment is less than about 1150 ft/second (350.5 m/sec). In a turbofan engine, lighter components generally lead to more efficient performance. If less energy is expended moving internal engine parts, more energy is available for useful work. At the same time, the components themselves must be strong enough to withstand forces typical for the operating environment and performance envelope.

As mentioned above a geared turbofan (GTF) engine for an aircraft includes a fan section 22, a compression section 24, a combustion section 26 and a turbine section 28. The fan section 22 includes a rotor assembly and a stator assembly. The fan blades extend through the flow path and interact with the working medium gases and transfer energy between the fan blades and working medium gases. The fan raises the pressure of the air drawn along the secondary flow path, thus producing useful thrust. In order to reduce the weight while forming a structurally sound internal configuration, the fan blades in GTF engines may be hollow and may be made out of high strength aluminum alloys. High strength aluminum alloys are prone to several types of corrosion that can proceed at relatively rapid rates in environments such as coastal locations. For aluminum fan blades, the main risk is galvanic corrosion of aluminum when it is electrically connected to the titanium leading edge or hub. To avoid rapid galvanically driven pitting of the aluminum beneath coating defects, it must be electrically isolated from the titanium components by ~1 Giga-ohm. This is partially achieved in the factory by applying an electrically isolating coating between the aluminum and titanium components via surface treatments that produce dielectric layers on the metals. The greatest corrosion concern for GTF fan blades is when moisture (dew, salt water mist, etc.) covers the Ti leading edge or hub and bridges coated aluminum. Factory isolated Ti leading edges may short in the field via tip rubs, conductive contaminates (soot), dielectric bond breakdown due to mechanical or electrical stresses such as static build-up, root wear pad failure, etc.

Additionally, it is found that some blades when exposed to contamination with moisture or process fluids can create "ionic" short circuits between aluminum and Ti that do not create the galvanic corrosion risk presented by "electronic" short circuits. Therefore, a new inspection method is needed to discriminate between blades with electronic shorts (scrap) and ionic shorts (can be dried to be remediated).

In order to protect the leading edge of the fan blade from erosion, a titanium sheath is attached. As discussed above it is desirable to maintain isolation between galvanically incompatible materials of the fan blade and more particularly, it is desirable to prevent the blade from becoming the anode in the galvanic couple and thus, prevent galvanic corrosion of the aluminum blade and inhibit other forms of corrosion. Although aluminum and titanium are disclosed other equivalent materials are completed to be within the scope of the present disclosure.

Figure 2:
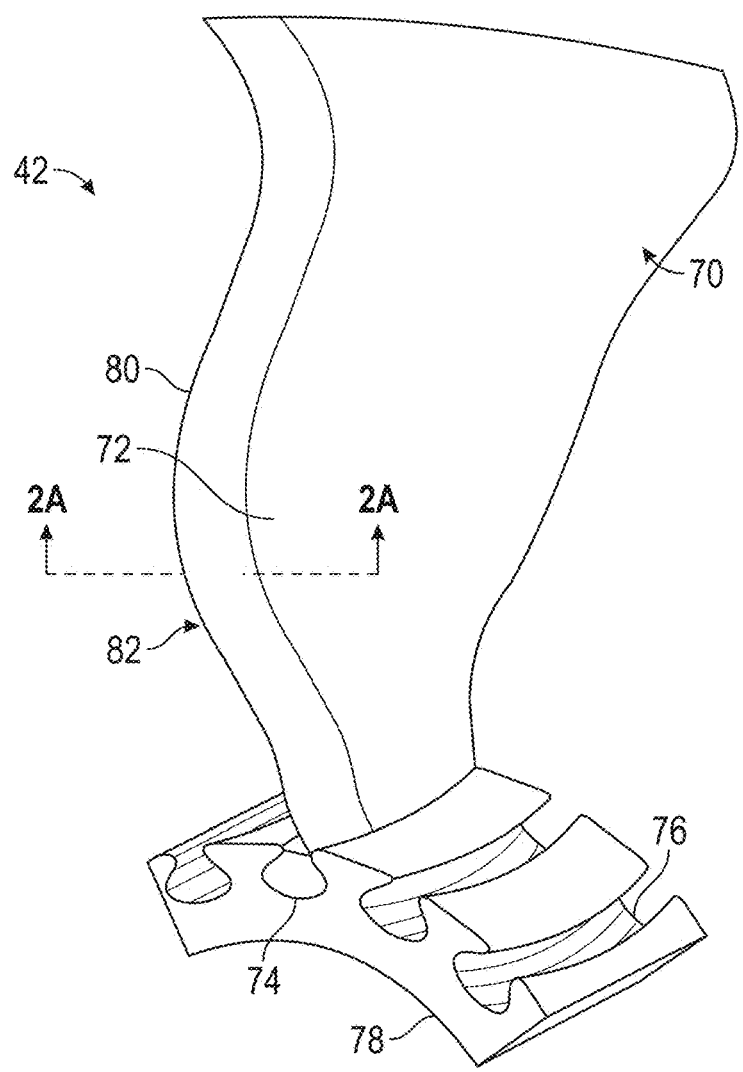
FIG. 2 is a perspective view of a fan blade of the gas turbine engine.
Figure 2A:
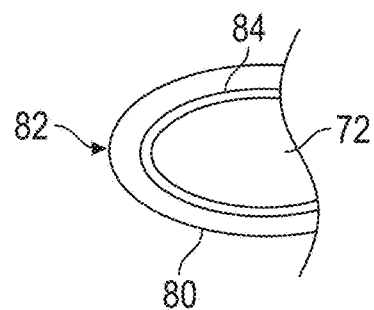
FIG. 2A is a partial cross-sectional view along lines 2A-2A of FIG. 2.

Referring now to FIGS. 2 and 2A, a fan blade 70 of the fan 42 of the engine 20 is illustrated. The fan blade 70 also includes an airfoil 72 and a root or root portion 74. The root or root portion 74 is received within a slot or cavity 76 of a rotor or rotor disk 78. Here root 74 is shown as a "dovetail" root; however other configurations are considered to be within the scope of the present disclosure.

The fan blade 70 may be solid or hollow. In the event the fan blade is hollow it will have at least one internal cavity (not shown) that is enclosed by a cover or shroud.

In one embodiment, a protective sheath 80 is disposed on a leading edge 82 of the fan blade 70. In one embodiment, the airfoil 72 may be made from an aluminum alloy material and the protective sheath 80 is formed from a titanium alloy. As mentioned above and since aluminum and titanium are galvanically incompatible a non-conductive material or insulator 84 is applied between the surface of the airfoil 72 and the protective sheath 80 to electrically isolate the two materials. In other words, the non-conductive material 84 electrically isolates the protective sheath 80 from the airfoil 72. There are many materials capable of electrically isolating the sheath 80 and the airfoil 72, some non-limiting examples include: adhesives, an epoxy adhesive, urethane; and equivalents thereof each of which are contemplated to be within the scope of the various embodiments of the present disclosure.

Figure 3:
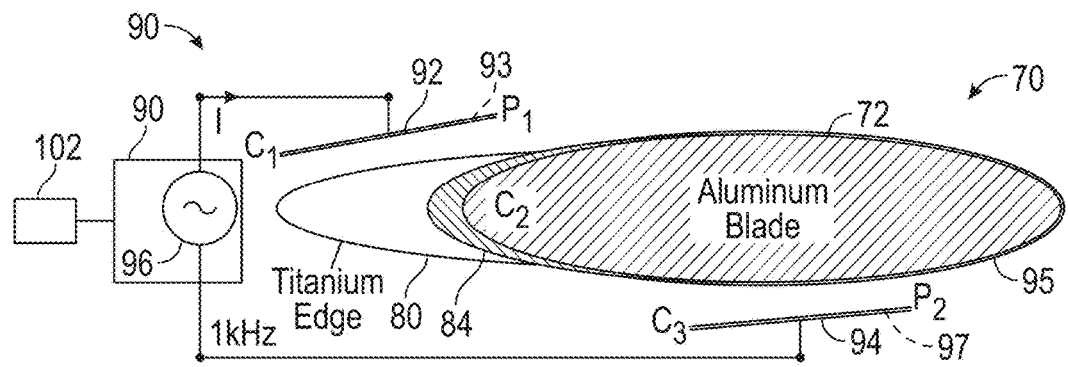
FIG. 3 a fixture or apparatus for determining electronic shorts between a sheath and an airfoil of a blade in accordance with an embodiment.

In accordance with one embodiment and referring now to FIG. 3, a fixture or apparatus 90 for determining electronic shorts between the sheath 80 and the airfoil 72 is illustrated. In the illustrated embodiment, a cross-sectional view of the fan blade 70 is provided. In one embodiment, the fixture or apparatus 90 may comprise a pair of plates 92 and 94, which when positioned proximate to the fan blade 70 can be used to determine whether the electrical isolation of the sheath 80 and airfoil 72 has been compromised. In one embodiment, the plates may be formed from copper of course, other suitable materials are configured to be within the scope of the present disclosure. In addition, the plates may be the same size or they may be different in size. As illustrated in FIG. 3, plate 92 is proximate to sheath 80 and plate 94 is proximate to airfoil 72 when the fixture or apparatus 90 is in a position to detect a short between the sheath 80 and the airfoil 72. However and in one embodiment, neither plate 92 or 94 will contact the blade 70. Thus, no damage is imparted to the blade 70 during the testing for a short between the sheath 80 and the airfoil 72. As such, a first capacitor C1, a second capacitor C2, and a third capacitor C3 are formed. The first capacitor C1 is formed by plate 92 and sheath 80 wherein the dielectric may include the air between them. Also and in some applications and since the sheath 80 is conductive the plate 92 will require a dielectric coating 93, which may be applied (e.g., glued/deposited) at least to the surface of the plate 92 facing the sheath 80. In other embodiments, the entire plate 92 is coated with coating 93. A non-limiting example of such a coating is a dielectric including but not limited to any of the following materials or combinations thereof; porcelain (ceramic), mica, glass, plastics, polymers, and oxides of various metals. The dielectric constant and thickness of this layer 93 as well as the copper plate area will eventually determine the capacitor value C1. The second capacitor C2 is formed by sheath 80 and a portion of the airfoil 72 since they are separated by insulator 84, which is the dielectric between them. The third capacitor C3 is formed by plate 94 and another portion of the airfoil 72 wherein the dielectric may include the air between them. Also and in some applications and since the aluminum body of the blade is usually coated with a coating 95. A non-limiting example of such a coating is an erosion resistant coating such as polyurethane elastomers. This coating 95 may be used in the capacitor construction of capacitor C3. Again, thickness and width of this layer will influence the capacitance value. If the aluminum body has no coating 95, then a dielectric layer 97 will be glued/deposited into or on at least the surface of the copper plate facing the aluminum blade body comprising airfoil 72 to form the capacitor C3. In one embodiment, the entire plate 94 is coated with coating 97. A non-limiting example of such a coating is a dielectric including but not limited to any of the following materials or combinations thereof; porcelain (ceramic), mica, glass, plastics, polymers, and oxides of various metals. The dielectric constant and thickness of this layer 97 as well as the copper plate area will eventually determine the capacitor value C3.

Since the second capacitor C2 is formed by sheath 80 and a portion of the airfoil 72 and the dielectric comprising the insulator 84, a measured leakage resistance R of this capacitor will be indicative of the electrical isolation of the sheath 80 from the airfoil 72. A voltage source 96 is operably coupled to the plates 92 and 94 and capacitors C1, C2 and C3 are in series. Accordingly and during the non-destructive testing of the fan blade 70, plates 92 and 94 are excited by the voltage source 96.

Accordingly and with reference to FIG. 3: C1 corresponds to the capacitance from fixture to titanium edge; C2 corresponds to capacitance due to titanium-aluminum isolation; C3 corresponds to capacitance from fixture to aluminum blade; and R corresponds to a resistance which changes with the degree of fault.

Figure 4:
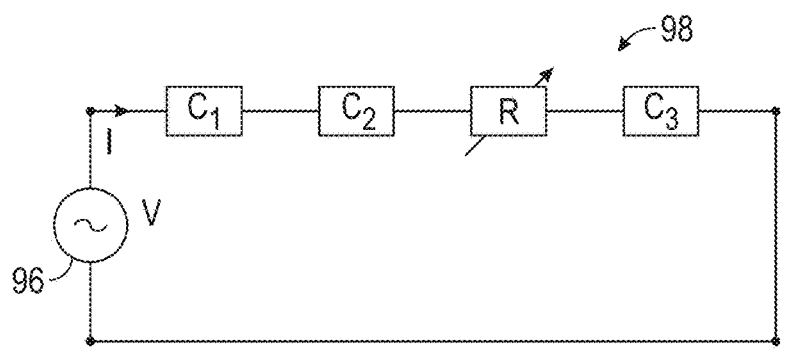
FIGS. 4 and 5 are illustrations of a circuit for the fixture and blade illustrated in FIG. 3.

Referring now to FIG. 4 an equivalent circuit 98 for the fixture or apparatus 90 the blade 70 and the three capacitors C1, C2 and C3 is illustrated. The equivalent circuit for the fixture or apparatus 90 includes capacitances C1 and C3 at the plates, capacitance C2 across the dielectric between aluminum and titanium, and resistance R that changes with the degree of fault or health of the insulator 84.

Figure 5:
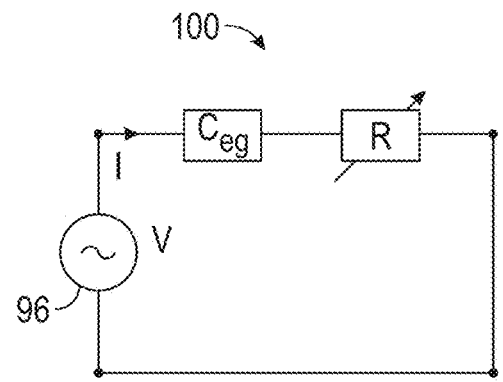

Since the capacitors are connected in series, the capacitances can be combined to find the equivalent capacitance, Ceq. This is illustrated by the circuit 100 in FIG. 5.

The total impedance across the plates and the corresponding phase shift are $$Z = R - j\frac{1}{wC_{eq}} = |Z|e^{j\Phi}$$

$$\Phi = \tan^{-1}\left(-\frac{1}{wRC_{eq}}\right) \quad |Z| = \sqrt{R^2 + \frac{1}{w^2C_{eq}^2}}$$

Accordingly, the voltage and the current on the fixture can be expressed as:

$$V = V_{max}e^{jwt}$$

$$I = V_{max}\frac{e^{jwt}}{Z} = |Z|V_{max}e^{j(wt-\Phi)}$$

The phase shift or time delay between the voltage and current can be measured to access the degree of fault, which is indicative of the health of the insulation layer 84.

In order to determine whether the sheath 80 of a fan blade 70 is properly insulated, the following method is proposed. The fixture or apparatus 90 comprising the two plates 92 and 94 is excited by the voltage sensor 96 to characterize blade isolation fault. In one embodiment, the plates 92 and 94 are excited at 1 kHz of course other values greater or less than 1 kHz may be used. The phase shift between voltage and current on the fixture or apparatus 90 may be used to determine the degree of fault. The phase shift due to fault is expected to increase as the frequency goes down. Thus that is why a frequency of excitation was selected to be low (e.g., 1 kHz).

Several plate sizes, P1 and P2, can be considered to come up with the right values of C1 and C3 that will make the fault more detectable.

Figure 6:
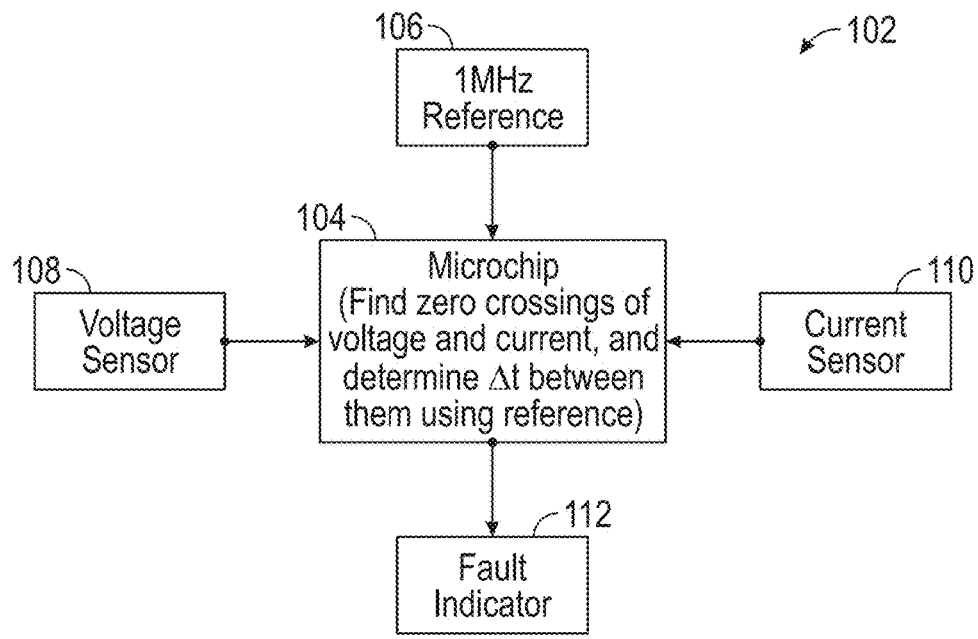
FIG. 6 is a schematic illustration of a system for detecting electrically shortened blades in accordance with an embodiment of the present disclosure.

Referring now to at least FIGS. 3 and 6 a schematic illustration of a system 102 for detecting electrically shortened blades is provided. System 102 is operably coupled to at least the plates 92, 94 and may be integrated into the fixture or apparatus 90 or may be operably coupled to the fixture or apparatus 90. In one embodiment, system 102 may comprise a computer, microprocessor, microcontroller or microchip 104 that runs a computer program to find zero crossings of voltage and current and determines Δt between them using a reference 106. In an exemplary embodiment, the system 102 may comprise a microprocessor, microcontroller or other equivalent processing device capable of executing commands of computer readable data or program for executing a control algorithm that controls the operation of the system 102. In order to perform the prescribed functions and desired processing, as well as the computations therefore (e.g., the execution of fourier analysis algorithm(s), the control processes prescribed herein, and the like), the controller may include, but not be limited to, a processor(s), computer(s), memory, storage, register(s), timing, interrupt(s), communication interfaces, and input/output signal interfaces, as well as combinations comprising at least one of the foregoing. For example, the controller may include input signal filtering to enable accurate sampling and conversion or acquisitions of such signals from communications interfaces. As described above, exemplary embodiments of the present disclosure may be implemented through computer-implemented processes and apparatuses for practicing those processes.

The voltage is provided by a voltage sensor 108 and the current is provided by a current sensor 110. If a fault is detected (e.g., insulation layer 84 compromised) an indication is provided by a fault indicator 112.

Figure 7:
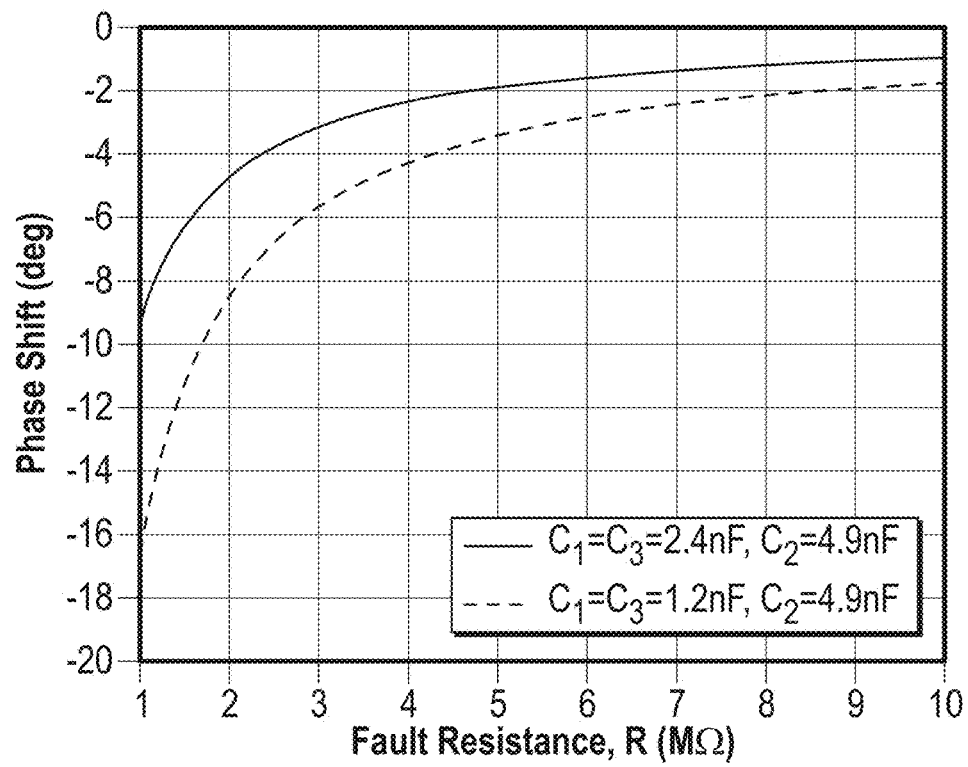
FIG. 7 is a graph illustrating the phase shift in degrees vs. fault resistance in MΩ for two different capacitance values.
Figure 8:
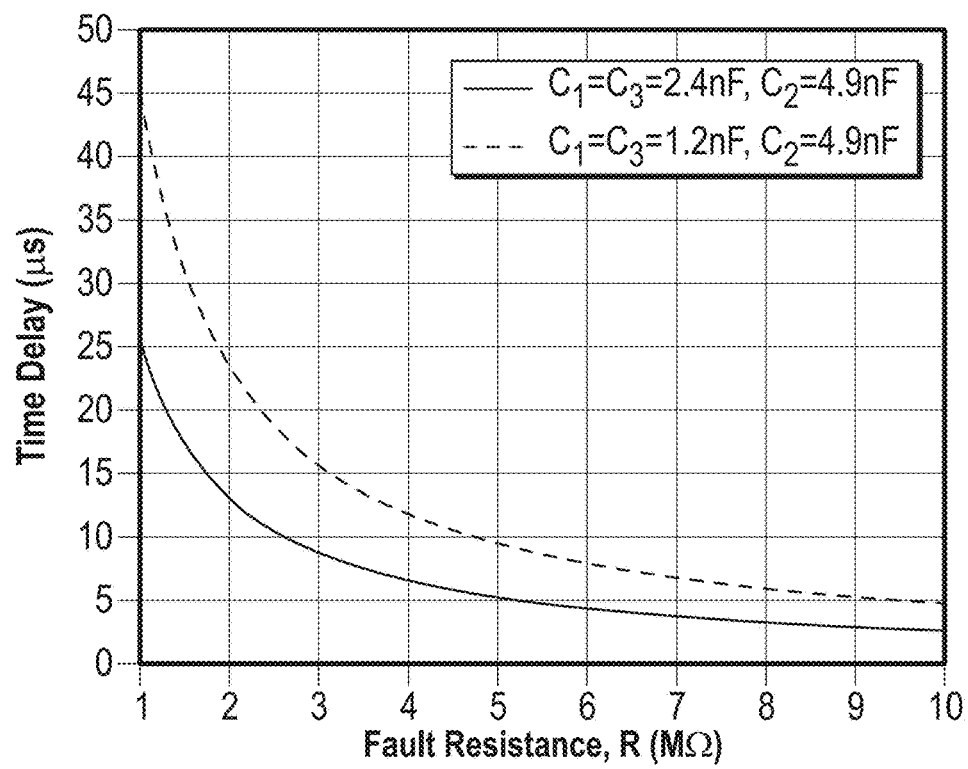
FIG. 8 is a graph illustrating the time delay in us vs. fault resistance in MΩ for two different capacitance values.

FIG. 7 is a graph illustrating the phase shift in degrees vs. fault resistance in MΩ for two different capacitance values of C1 and C3. FIG. 8 is a graph illustrating the time delay in us vs. fault resistance in MΩ for two different capacitance values of C1 and C3.

Accordingly, various embodiments of the present disclosure are directed to a method and apparatus for detecting electrically shortened blades in the factory and during operation. The blades may be those used in a geared turbofan engine. The method and apparatus provides a non-contact detection method for confirming electrical isolation of leading edge sheaths from erosion coated blades. The non-contact approach is desired as the aluminum section of the blade is coated and protected against corrosion/erosion and it is not possible to establish electrical contact with it.

As mentioned above, the detection system consists of a fixture or apparatus having two plates and an excited source at 1 kHz to characterize blade isolation fault. The phase shift (time delay) between applied voltage and current on the fixture can be used a computer, microprocessor, microcontroller or microchip of a system to determine the degree of fault (resistor value). Phase shift due to fault is expected to increase as the frequency goes down. The detector equivalent circuit includes three capacitors: (1) the first capacitor is coupled through a dielectric to the titanium edge, (2) the second capacitor is formed by the factory applied insulation coating between the titanium edge and the aluminum body, and (3) the third capacitor is coupled through a dielectric to the main aluminum blade. Capacitor one and three are connected in series and can be assembled into a slide-on fixture. These two fixture capacitors are electrically in series with the second capacitor as shown in the equivalent circuit diagram in FIG. 4. The electrical current is applied through the two fixture capacitors and passes through all three capacitors in series configuration.

The benefits of this disclosure include providing a low-cost none destructive measurement of blade isolation. This provides a step change in inspection technology as current typical methods (DC measurements) are limited to striping and contacting both metals. The method can additionally be used for inspecting blades while attached to the hub. This results in a significant maintenance cost savings.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An apparatus for detecting a short in a blade of a gas turbine engine, the blade comprising: an airfoil formed from a first material; a protective sheath disposed on a leading edge of the airfoil, the protective sheath being formed from a second material, the first material being galvanically incompatible with the second material and the first material being less noble than the second material; and a non-conductive material disposed between the protective sheath and the airfoil so that they are electrically isolated from each other, wherein the apparatus comprises:
    a first plate configured to form a first capacitor with the protective sheath when the apparatus is located proximate to the blade;
    a second plate configured to form another capacitor with a portion of the airfoil when the apparatus is located proximate to the blade; and
    a voltage source electrically connected to the first plate and the second plate.

2. The apparatus as in claim 1, wherein the first plate is spaced from the sheath and the second plate is spaced from the airfoil when the apparatus is located proximate to the blade.

3. The apparatus as in claim 1, wherein the first material is aluminum.

4. The apparatus as in claim 1, wherein the second material is titanium.

5. The apparatus as in claim 1, wherein the first plate and second plate are formed from copper.

6. The apparatus as in claim 1, wherein the first material is aluminum, the second material is titanium and the first plate and second plate are formed from copper and wherein the first plate and second plate are coated with a dielectric including but not limited to any of the following materials or combinations thereof porcelain (ceramic), mica, glass, plastics, polymers, and oxides of various metals.

7. The apparatus as in claim 1, further comprising a microprocessor operatively coupled to a voltage sensor and a current sensor, wherein the microprocessor is configured to provide a signal to a fault indicator if a detected resistance between the protective sheath and the airfoil is less than a predetermined value.

8. The apparatus as in claim 7, wherein the first material is aluminum, the second material is titanium and the first plate and second plate are formed from copper.

9. A method of determining an electrical short between a sheath and an airfoil of a fan blade of a gas turbine engine, comprising:
    creating a first capacitor by locating a first plate proximate to the sheath of the airfoil, wherein sheath is formed from a first material and the sheath is electrically insulated from the airfoil by an insulator, wherein a second capacitor is formed by a portion of the sheath, a portion of the insulator and a portion of the airfoil and wherein the airfoil is formed from a second material, the first material being galvanically incompatible with the second material and the second material being less noble than the first material;
    creating a third capacitor by locating a second plate proximate to another portion of the airfoil, wherein the first capacitor, the second capacitor and the third capacitor are electrically connected in series;
    exciting the first plate and the second plate by a voltage source; and
    determining a resistance of the second capacitor wherein the determined resistance is indicative of an electrical short between the sheath and the airfoil.

10. The method as in claim 9, wherein the electrical short is detected without damaging the fan blade.

11. The method as in claim 9, wherein the first plate is spaced from the sheath and the second plate is spaced from the airfoil.

12. The method as in claim 9, wherein the electrical short is detected while the fan blade is secured to the gas turbine engine.

13. The method as in claim 9, wherein the electrical short is detected without removing the fan blade from a hub.

14. The method as in claim 9, wherein the first material is titanium and wherein the second material is aluminum.

15. The method as in claim 9, wherein the first plate and second plate are formed from copper.

16. The method as in claim 9, wherein the first material is titanium, the second material is aluminum and the first plate and second plate are formed from copper and wherein the first plate and second plate are coated with a dielectric including but not limited to any of the following materials or combinations thereof; porcelain (ceramic), mica, glass, plastics, polymers, and oxides of various metals.

17. The method as in claim 9, further comprising sensing with a microprocessor the resistance of the second capacitor.

18. The method of claim 17, wherein the microprocessor is operatively coupled to a voltage sensor and a current sensor, wherein the microprocessor is configured to provide a signal to a fault indicator if the resistance of the second capacitor is less than a predetermined value.

19. The method as in claim 18, wherein the first material is titanium, the second material is aluminum and the first plate and second plate are formed from copper.

20. The method as in claim 19, wherein the electrical short is detected without damaging the fan blade.

* * * * *